United States Patent [19]

Ortiz, Jr.

[11] Patent Number: 4,927,226

[45] Date of Patent: May 22, 1990

[54] MULTIPLEXER FOR HIGH POWER CW LASERS

[75] Inventor: Angel L. Ortiz, Jr., Scotia, N.Y.

[73] Assignee: General Electric Company, Schenectady, N.Y.

[21] Appl. No.: 329,160

[22] Filed: Mar. 27, 1989

[51] Int. Cl.[5] ............................ G02B 6/32; B23K 9/00
[52] U.S. Cl. .................................... 455/611; 455/609; 250/231.1; 219/121.60; 219/121.77; 350/6.6; 350/96.18; 372/10
[58] Field of Search ............... 350/96.15, 96.16, 96.18, 350/96.20, 6.6; 250/227, 201, 571; 219/121.45, 121.26, 121.60, 121.74, 121.75, 121.76, 121.77; 358/93, 217; 455/608, 609

[56] References Cited

U.S. PATENT DOCUMENTS

| 4,676,586 | 6/1987 | Jones et al. | 350/96.20 |
| 4,681,396 | 7/1987 | Jones | 350/96.18 |
| 4,695,697 | 9/1987 | Kosa | 219/121 LZ |
| 4,696,061 | 9/1987 | Labrum | 455/609 |
| 4,739,162 | 4/1988 | Ortiz, Jr. et al. | 250/227 |
| 4,809,014 | 2/1989 | Kempter et al. | 346/76 L |
| 4,838,631 | 6/1989 | Chande et al. | 350/6.6 |
| 4,845,354 | 7/1989 | Gupta et al. | 250/205 |

*Primary Examiner*—Frank Gonzalez
*Assistant Examiner*—Akm E. Ullah
*Attorney, Agent, or Firm*—John S. Beulick; James C. Davis, Jr.; Paul R. Webb, II

[57] ABSTRACT

Apparatus for multiplexing a coherent high power CW laser beam has a mirror mounted on a galvanometer to interrupt the laser beam and another mirror mounted on another galvanometer to deflect the laser beam to a selected pair of optical fibers. The other mirror is moved only when the laser beam is interrupted to avoid fiber damage. Yet another mirror mounted on a galvanometer can be used to provide a greater number of addressable fibers. A method of multiplexing comprises interrupting a laser beam, deflecting it, changing its direction only when interrupted, focussing it, and transmitting it through the optical fibers.

16 Claims, 6 Drawing Sheets

MULTIPLEXER FOR HIGH POWER CW LASERS

BACKGROUND OF INVENTION

The present invention relates to apparatus and method for sharing a high power laser beam, and more particularly, to such apparatus and method for use to perform industrial processes.

It is known to multiplex a pulse laser by using x-axis and y-axis galvanometers to change the direction of the high power laser beam, and thus, select which one of a two dimensional array of optical fibers receives the laser beam at input ends. The second ends of the fibers are disposed near the respective work sites to perform an industrial process, e.g., cutting, positive machining, etc. The galvanometers change the direction of the laser beam only between the pulses, i.e., when no light is present. Such multiplexers are shown in U.S. Pat. No. 4,739,162, U.S. Patent Appl. No. 944,771, filed Dec. 22, 1986 now U.S. Pat. No. 4,838,631, and devices manufactured by Robolase Systems, Inc., Costa Mesa, Calif. However, certain processes, e.g., soldering, cannot be performed using a high power pulsed laser since the high peak power and short pulse duration will cause the solder to evaporate and, therefore, not solder the material to be soldered. Hence, soldering requires a high power continuous wave (CW) laser. If the prior art multiplexing apparatus were used with a high power CW laser, the cladding at the input ends of the fibers will be damaged when the address to the galvanometers are changed. This is true because as the galvanometers scan the beam, the beam begins to burn the fiber cladding due to beam motion.

It is, therefore, an object of the present invention to provide multiplexing apparatus and method for use with a high power CW laser that will not damage the cladding of optical fibers.

SUMMARY OF THE INVENTION

Apparatus for multiplexing a coherent high power continuous wave laser beam having an first path comprises means for interrupting the propagation of said light beam along the first path; deflection means, disposed in the first path after said interruption means, for changing the direction of at least a portion of said laser beam to a second path, said deflection means changing the direction of said other path only when said interruption means is interrupting the propagation of said laser beam; first focussing means disposed in said second path and having a first focus plane; and a first plurality of means for transmitting laser beams, each of said plurality of means having an end disposed in said first focus plane.

A method for multiplexing a coherent continuous wave laser beam comprises interrupting the propagation of the laser beam along a first path; deflecting at least a portion of the beam to a second path; changing the direction of said second path only when the beam is interrupted; focussing the laser beam in said second path; and transmitting the focussed laser beam.

DESCRIPTION OF THE DRAWING

In the FIGURES corresponding elements are given corresponding reference numerals.

DETAILED DESCRIPTION

Figure 1:
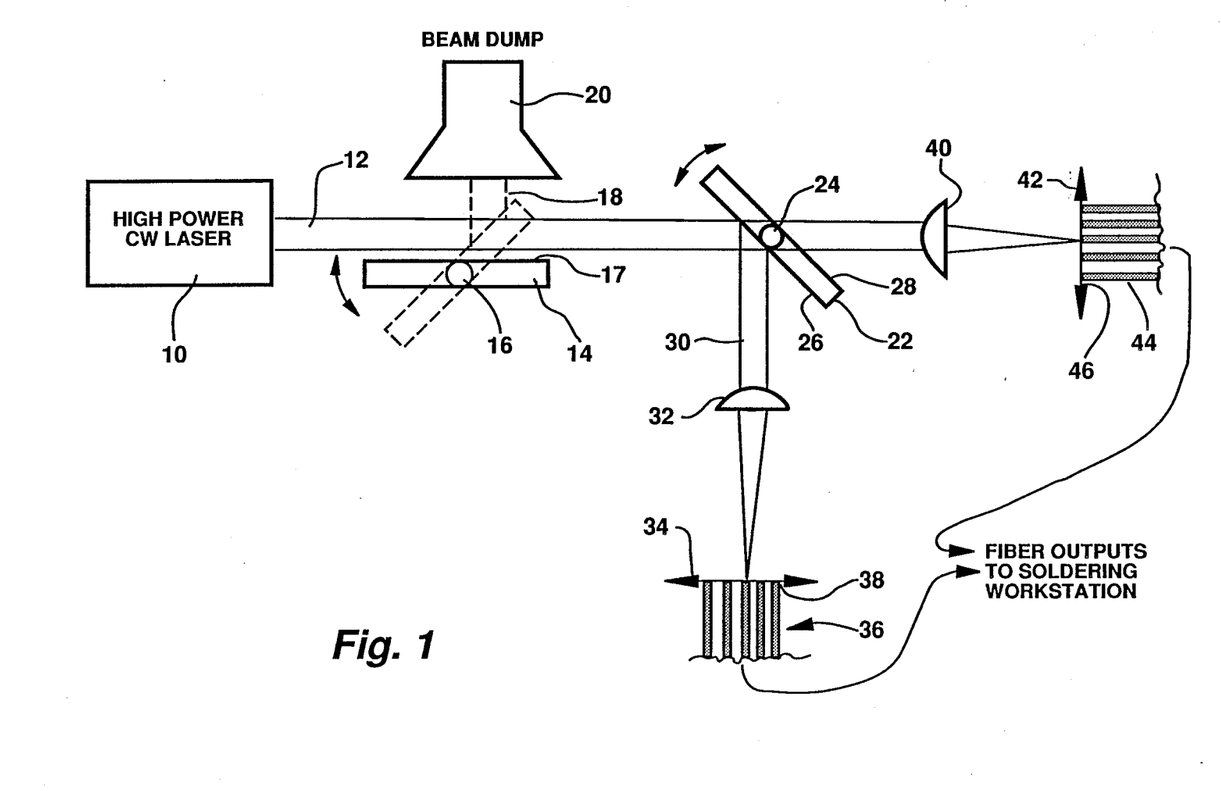
FIG. 1 is a schematic diagram of a first embodiment of the invention.

In FIG. 1 is a high power CW laser 10, which typically is of the Nd:YAG type or any high power solid state or gas laser operating from ultraviolet (193 nm) to near infrared (2 $\mu$m), and typically provides about 0.5 to 1.5 kilowatts of coherent light at 1.06 $\mu$m as indicated by the beam 12 having an undeflected first path. Adjacent the beam 12 is an interruption means, such as a dump mirror 14 and a dump galvanometer 16. While a mechanical beam deflector, such as a rotatory solennoid having a mirror mounted thereon could be used, the addressing operation (described below) would be several orders of magnitude slower and mirror ringing would occur. A galvanometer is much faster, typically less than 20 milliseconds, and since it is part of a negative feedback circuit, ringing is eliminated and positions are thermally stabilized. Mirror 14 has a fully (100%) reflecting coating on its side 17 and is mounted on the galvanometer 16, such as model XY3035 manufactured by General Scanning, Inc., Watertown, Mass., for rotation between two positions. The first position (shown in solid lines) does not deflect the beam 12, while the second position (shown in dotted lines) changes the beam direction to a deflected additional path 18, which path terminates in a beam dump 20, such as a model 213 power meter manufactured by Coherent, Inc., Palo Alto, Calif. In general, the mirror 14 is in the second position when changing the addressing of optical fibers (described below) to prevent damage to the cladding thereof, when the required fiber exposure time has elapsed, when a power measurement is required, or when an emergency condition exists (described below).

If the laser beam 12 is undeflected, the laser beam continues until it reaches a deflection means, such as a first addressing mirror 22 and a first addressing galvanometer 24. Mirror 22 has a partially reflecting, e.g., 50%, coating on its front side 26 and an antireflection coating on its back side 28. Mirror 22 typically can be rotated ±16 optical degrees (±8 mechanical degrees since the angle of incidence equals the angle of reflection) from the 45 degree center position shown in FIG. 1. A first portion of beam 12 is transmitted, while a second portion is reflected by the mirror 22 to a second path 30. Disposed in the path 30 is a first focussing means, such as a first antireflection coated planoconvex or other type of lens 32, having a first focal plane 34. A first plurality of means for transmitting laser beams such as optical fibers 36, have respective input ends 38 disposed in focal plane 34, preferably in a holder as shown in U.S. Pat. No. 4,744,627. The output ends of fibers 36 (not shown) are disposed at respective workstations (not shown).

In general, the smaller the fiber diameter, the greater the flexibility and the smaller the bend radius. Hence the output ends of fibers 36 can be more easily positioned near difficult to reach locations of the workpiece. Also small fiber diameters have a good beam quality. On the other hand, since the spot size of the injected laser beam must be smaller than the fiber diameter to prevent fiber damage, too small a diameter cannot be used. Typically, fiber diameters between about 100 to 1000 μm can be used.

The first portion of the laser beam 12 passes through the mirror 22 still along first path 12 and is incident upon a second focussing means, such as a second antireflection coated plano-convex or other type of lens 40, having a second focal plane 42. The mirrors 14 and 22 and lens 32 and 40 can be purchased from CVI Laser Corp., Albuquerque, N.M. A second plurality of means for transmitting laser beams such as optical fibers 44, have input ends 46 disposed in plane 42 and output ends (not shown) disposed at respective workstations (not shown). Preferably, the input ends 38 and 46, as well as the output ends of fibers 36 and 44, are prepared as shown in U.S. Pat. Nos. 4,676,586 and 4,681,396, so that the cladding of fibers 36 and 44 is not damaged by the injected or emitted high power laser beam.

It will be appreciated that the rotation of the addressing mirror 22 changes the focal points within the planes 34 and 42 and, thus, which one of the fibers 36 and which one of the fibers 44 is addressed, i.e., has a laser beam injected into it. Since a pair of fibers is addressed at any one time, i.e., one of the fibers 36 and one of the fibers 44, the fiber pairs are selected to have the same required addressing time. If the fibers 36 are sufficient in number for the number of workstations, then the mirror 22 can be totally deflecting and lens 40 and fibers 44 eliminated.

Figure 2:
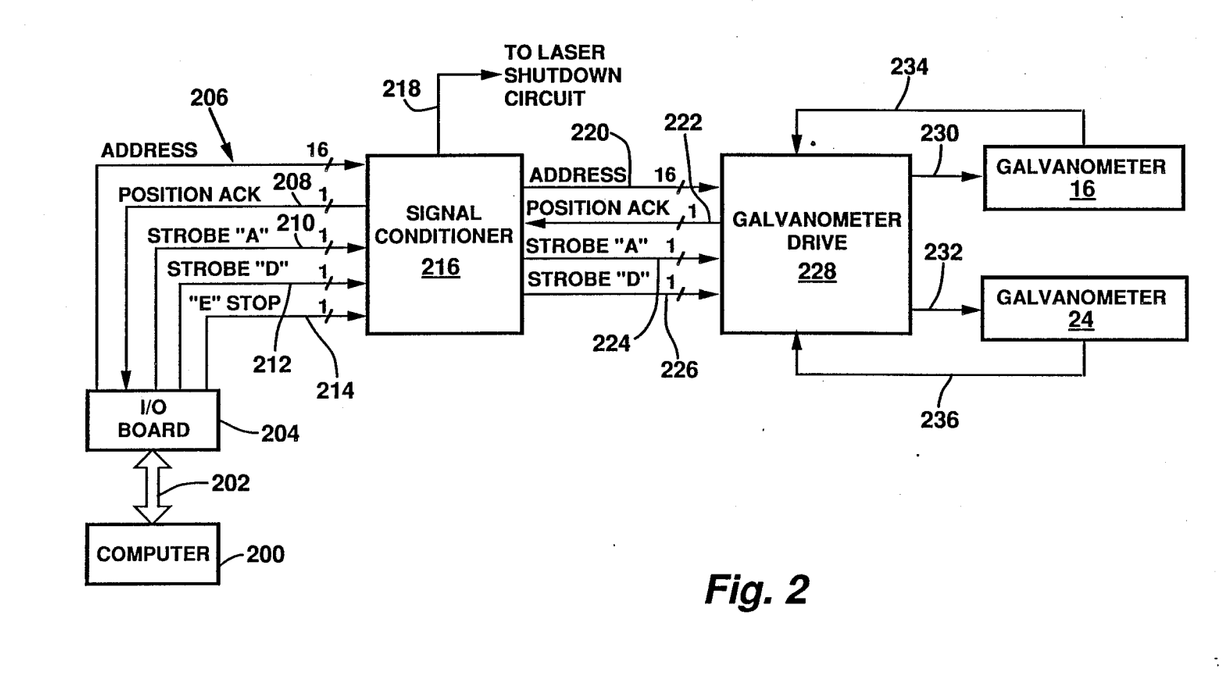
FIG. 2 is a block diagram of a control system for the embodiment of FIG. 1.

In FIG. 2 is shown a computer 200, such as an IBM PC/AT, that is connected by bus 202 to a 24-bit input-/output board 204, such as model DDA-06 manufactured by Metrabyte, Inc., Taunton, Mass. Board 204 provides on bus 206 a 16-bit address signal for positioning the galvanometers 16 and 24, and receives a 1-bit position acknowledge signal (POSACK) on line 208 conveying information relating to when the galvanometers 16 and 24 have been commanded to move (logic level changes from 0 to 1) and when the movement is complete (return to logic 0). Board 204 also provides a strobe A (address) signal on 1-bit line 210 to initiate movement of the galvanometer 24, a strobe D (dump) signal on 1-bit line 212 that initiates movement of the galvanometer 16, and an emergency E-STOP (emergency stop) signal on the 1-bit line 214 that shuts down the laser 10. These signals are provided to, or received from, a signal conditioner 216, such as non-inverting buffers type LS244 manufactured by Texas Instruments, Dallas, Tex. One output signal from conditioner 216 is applied to line 218 and then to a laser shutdown circuit (not shown), e.g., a shutter, a Q-switch, a power supply cut-off circuit, a laser control circuit, etc. The address signals are applied to 16-bit bus 220, the POSACK signal received on 1-bit line 222, the strobe A signal provided to 1-bit bus 224, the strobe D signal provided to 1-bit bus 226, all to, or from for the POSACK signal, galvanometer drive circuit 228, which is manufactured by said General Scanning Co. The drive circuit 228 respectively provides on cables 230 and 232 to galvanometers 16 and 24 analog deflection signals, and power for a position sensor (not shown) and a heating blanket (not shown). The galvanometers 16 and 24 respectively provide on cables 234 and 236 to circuit 228 a position signal, an automatic gain control (AGC) signal, and a temperature signal from thermistors (not shown) mounted in galvanometers 16 and 24, respectively.

Figure 3:
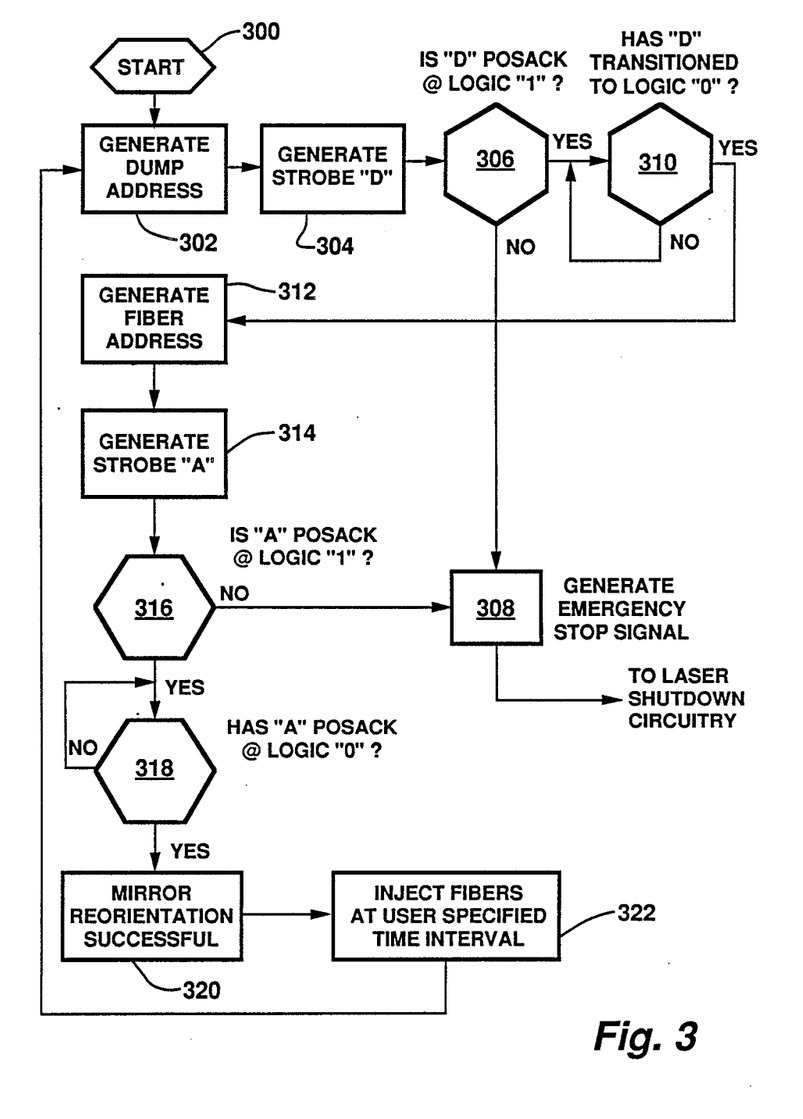
FIG. 3 is a flow chart of a program used in a computer in FIG. 2.

FIG. 3 shows a flow chart of a program used in computer 200. Terminal block 300 indicates the start of the program which causes a dump address to be generated as indicated by process block 302. Before generating the strobe D signal, the POSACK signal is a logic 0. Next, the strobe D signal is generated as indicated by process block 304, which should cause the POSACK signal to become 1 to indicate that galvanometer 16 is moving. This is checked in decision block 306. If POSACK is not 1, e.g., galvanometer 16 or its drive circuitry 228 is defective, or something is blocking it from rotation, then, as indicated by process block 308, the E-STOP signal is generated to shutdown the laser. If POSACK is 1, i.e., galvanometer 16 is properly moving, then, as indicated by decision block 310 a check is made to see if POSACK has returned to 0, i.e., galvanometer 16 is at its dump address. If not, the check is repeated.

When POSACK has returned to 0, which indicates that galvanometer 16 and mirror 14 are in the dump position, then the fiber address is generated, as indicated by process block 312. Then strobe A is generated, as indicated by process block 314. As indicated by decision block 316 if POSACK is not 1, then the E-STOP signal is generated (block 308). If POSACK is 1, then, as indicated by decision block 318 a check is made to see if POSACK has returned to 0. If not, then the check is repeated, while if yes, this means that galvanometer 24 and mirror 22 are at the selected address, as indicated by block 320. Then, as indicated by process block 322, the addressed fiber pair are injected for a user specified time duration or interval. Thereafter, a dump address is generated, as indicated by process block 302 and the entire process is repeated using the next fiber pair address.

The above described first embodiment has limitations on the number of fiber pairs that can be addressed due to limitations of angular displacement of galvanometers 16 and 24 and the diameter of the lens 32 and 40. The second embodiment of FIGS. 4, 5, and 6 can be used to address more fibers. The second embodiment of FIG. 4 differs from that of FIG. 1 in that in first path 12 is disposed a deflection means, such as a fixed mirror 50, having a partially reflecting coating, e.g., 50%, on its front-side 52 and an antireflection coating on its backside 54. A third portion of the beam 12 is reflected onto a third path 56 to impinge upon a deflection means, such as a second addressing mirror 58, having a partially reflecting, e.g., 50%, front side 60 and a back side 62 with an antireflection coating. Mirror 58 is mounted on a second addressing galvanometer 63. A portion of the beam in path 56 is reflected onto to a fourth path 64 and then to a third focussing means, such as a plano-convex lens 66 having a third focal plane 68, to be focussed at the ends 69 of a third means for transmitting laser beams, such as a third plurality of optical fibers 70. The input ends 69 are disposed in plane 68. Similarly, the portion of the beam 56 that is transmitted laser beams undeflected by mirror 58 goes to a fourth focussing means, such as a plano-convex lens 72, having a fourth focal plane 73 to be focussed upon the input ends 74 of a fourth means for transmitting laser beams, such as a fourth plurality of optical fibers 76. The input ends 74 are disposed in plane 73. The lens 66 and 72 have an antireflection coating thereon. The remaining ends of the optical fibers 70 and 76 go to additional soldering workstations.

Figure 5:
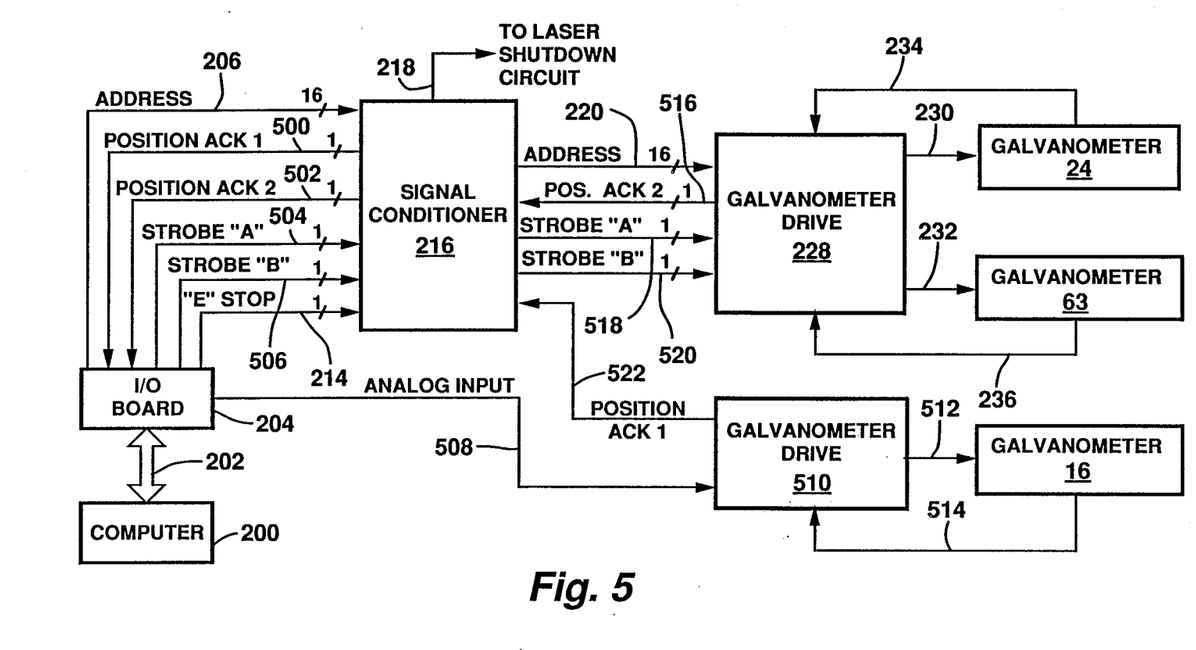
FIG. 5 is a block diagram of a control system for the embodiment of FIG. 4.

The control system block diagram of FIG. 5 for the second embodiment differs from FIG. 2 in that 1-bit line 500 conveys to board 204 a position acknowledgement (POSACK 1) signal from galvanometer 16, 1-bit line 502 conveys to board 204 a position acknowledgement (POSACK 2) signal from galvanometers 24 and 63, 1-bit line 504 provides to conditioner 216 a strobe A signal about galvanometer 63, and 1-bit line 506 provides to conditioner 216 a strobe B about galvanometer 24.

Further, galvanometer 16 is not strobed, but instead board 204 provides a bipolar analog drive signal on line 508 to galvanometer drive circuit 510, such as model CX660, made by said General Scanning, Inc. Galvanometer 16 can be model G350DT also made by General Scanning, Inc. Galvanometer 16 receives a control signal on line 512 and provides a feedback signal on line 514 to circuit 510. The control and power signals on line 512 are similar to that described above in conjunction with FIG. 2 for the signals on lines 230 and 232, while the feedback signals on line 514 is similar to the signals on lines 234 and 236 of FIG. 2.

The signal conditioner 216 receives the POSACK 2 signal on 1-bit line 516 from conditioner 228, and supplies thereto the strobe A signal on 1-bit line 518 and the strobe B signal on 1-bit line 520. Further, conditioner 216 receives POSACK 1 signal on line 522 from drive circuit 510. The remaining lines carry the same signals as the correspondingly numbered lines in FIG. 2.

Figure 4:
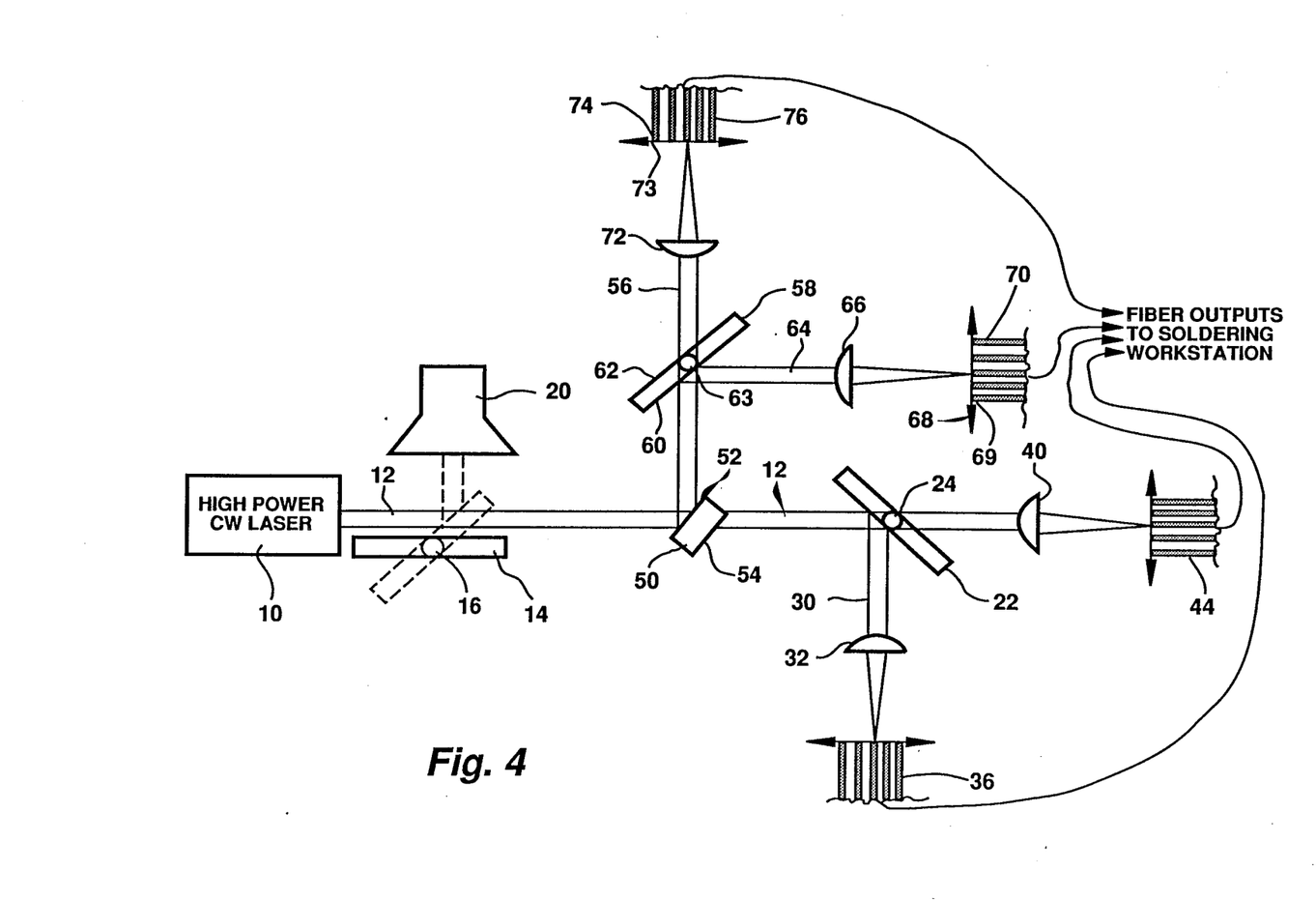
FIG. 4 is a schematic diagram of a second embodiment of the invention.
Figure 6:
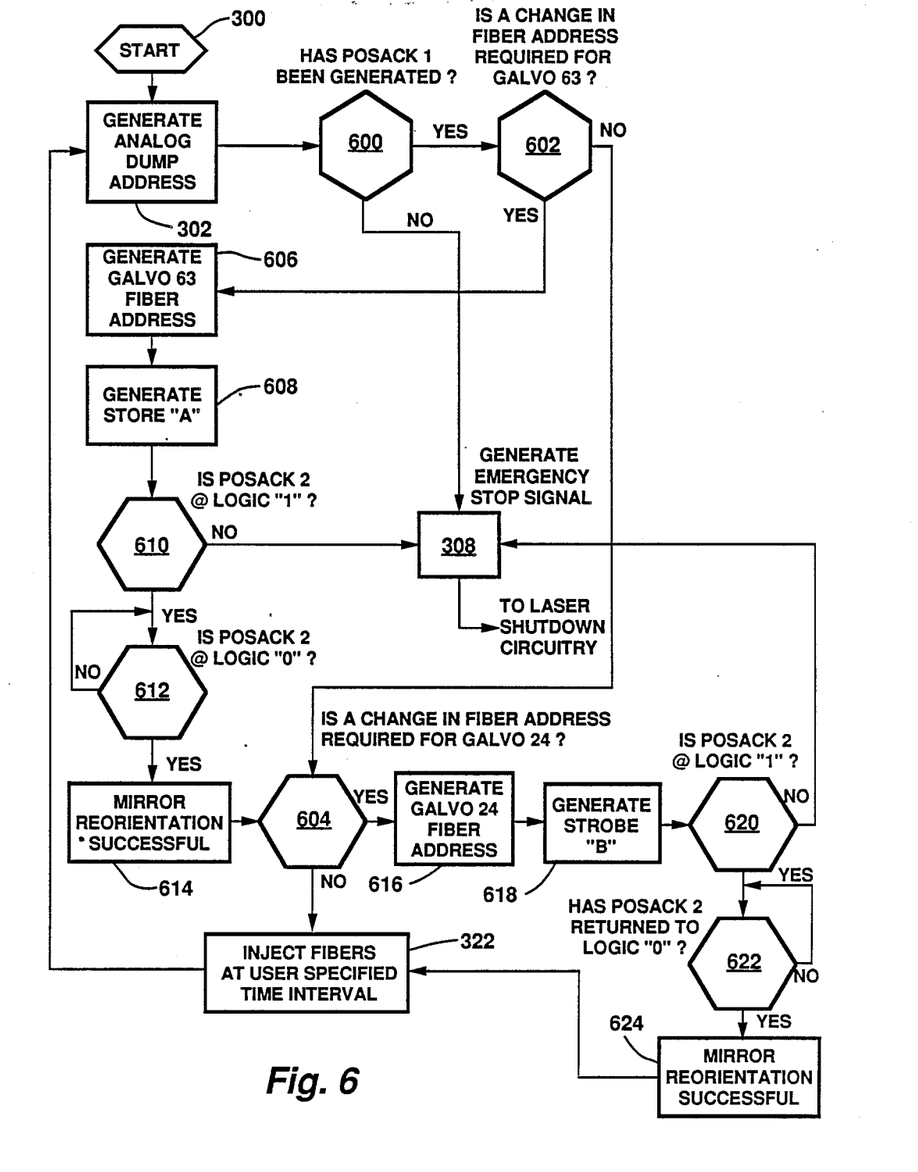
FIG. 6 is a flow chart of a program used in a computer in FIG. 5.

FIG. 6 shows a flow chart for the computer 200 of FIG. 4. Terminal block 300 shows the start of the program which causes an analog dump address to generated on line 508 (FIG. 5) as indicated by process block 302. Next, as indicated by decision block 600, a check is made to see if POSACK 1 signal is generated, i.e., at logic 1. If not, then the E-STOP (emergency stop) signal is generated as indicated by process block 308. If POSACK 1 is generated, then, as indicated by decision block 602 a check is made to see if a change in fiber address is required for galvanometer 63. If not, then the program goes to decision block 604.

If yes, then the address for galvanometer 63 is generated as indicated by process block 606. Next, strobe A signal is generated (process block 608). Then, as indicated by decision block 610, a check is made to see if POSACK 2 is at logic 1. If not, then the E-STOP signal is generated (process block 308). If yes, then, as indicated by decision block 612 a check is made to see if it has returned to logic 0. If no, the check is repeated. If yes, then this means that the orientation of galvanometer 63 and mirror 58 is correct, as indicated by block 614. Thereafter, as indicated by decision block 604, a check is made if an address change is required for galvanometer 24, which check is also made if no address change is required for galvanometer 63 (block 602). If not, then all optical fibers 36, 40, 70, and 76 (FIG. 4) are injected for the use specified time interval (block 322) and the program returns to the beginning (block 302) to be repeated with the next address.

If the answer to decision block 604 is yes, then the address for galvanometer 24 is generated (process block 616). Thereafter, the strobe B signal is generated (process block 618). Next, as indicated by decision block 620, a check is made if POSACK 2 is a logic 1. If not, then the E-STOP (emergency stop) is generated (process block 308). If yes, a check is made to see if POSACK 2 has returned to logic 0, as shown in decision block 622. If not, the check is repeated. If yes, then the galvanometer 24 and mirror 22 are oriented correctly. Then the fibers are injected (process block 322) and the program returns to block 302.

It will be appreciated that many other embodiments are possible within the spirit and scope of the invention. For example, instead of the dump galvanometer 16 and dump mirror 14, the interruption means can comprise a Q-switch located inside of the cavity of laser 10 in order to start and stop lasing. Such as laser is still considered a CW and not a pulsed laser as long as the excitation energy from, e.g., flash tubes, is continuously present except for any required emergency shut off. Also, further, beam splitters, mirrors, and galvanometers can be used to address a still greater number of optical fibers.

What is claimed is:

1. Apparatus for multiplexing a coherent high power continuous wave laser beam having a first path, said apparatus comprising:
   means for interrupting the propagation of said light beam along the first path;
   deflection means, disposed in the first path after said interruption means, for changing the direction of at least a portion of said laser beam to a second path, said deflection means changing the direction of said first path only when said interruption means is interrupting the propagation of said laser beam;
   first focussing means disposed in said second path and having a first focus plane; and
   a first plurality of means for transmitting laser beams, each of said plurality of means having an input end disposed in said first focus plane.

2. The apparatus of claim 1 further comprising a laser means for providing said coherent light beam.

3. The apparatus of claim 2 wherein said laser means comprises a ND:YAG laser.

4. The apparatus of claim 1 wherein said interrupting means comprises a galvanometer and a mirror mounted on said galvanometer for deflecting the laser beam to an additional path.

5. The apparatus of claim 4 further comprising a beam dump disposed in said additional path.

6. The apparatus of claim 5 wherein said beam dump comprises a power meter.

7. The apparatus of claim 1 wherein said deflection means comprises a first addressing galvanometer and a first addressing mirror mounted on said galvanometer.

8. The apparatus of claim 7 wherein said mirror is partially reflecting to transmit a portion of said laser beam, and further comprising:
   a second focussing means disposed in the path of said transmitted portion and having a second focus plane; and
   a second plurality of means for transmitting laser beams, each of said second plurality of means having an input end disposed in said second focus plane.

9. The apparatus of claim 1 wherein said focussing means comprises a lens.

10. The apparatus of claim 9 wherein said lens is plano-convex.

11. The apparatus of claim 1 wherein said first plurality of means for transmitting laser beams comprises optical fibers.

12. The apparatus of claim 8 further comprising:
   a fixed partially reflecting mirror disposed in said first path between said interrupting means and said deflection means to provide a portion of the laser beam along a third path;

a second addressing galvanometer;

a second addressing partially reflecting mirror disposed in said third path and mounted on said second galvanometer to change the direction of a portion of the incident laser beam to a fourth path, said second addressing mirror and said second addressing galvanometer changing the direction of said fourth path only when said interrupting means is interrupting the laser beam, said second addressing mirror transmitting another portion of said incident laser beam in said third path;

third and fourth focussing means respectively disposed in said third and fourth paths and respectively having third and fourth focus planes; and third and fourth pluralities of means for transmitting laser beams having ends respectively disposed in said third and fourth focus planes.

13. A method for multiplexing a coherent continuous wave laser beam, said method comprising:

interrupting the propagation of the laser beam along a first path;

deflecting at least a portion of the beam to a second path;

changing the direction of said second path only when the laser beam is interrupted;

focusing the laser beam in said second path; and transmitting the focussed light.

14. The method of claim 13 further comprising measuring the power of the interrupted laser beam.

15. The method of claim 13 further comprising transmitting a portion of the laser beam in said first path after said deflecting step, focussing the transmitted portion, and transmitting the focussed laser beam in said first path.

16. The method of claim 15 further comprising:

partially reflecting the interrupted laser beam to a third path;

deflecting a portion of the partially reflected laser beam to a fourth path;

changing the direction of said fourth path only when the laser beam is interrupted;

focussing the laser beam in said fourth path;

transmitting the focussed laser beam in said fourth path;

transmitting a portion of the laser beam in said third path after said deflecting step;

focussing the transmitted portion; and transmitting the focussed laser beam in said third path.

* * * * *